Nov. 18, 1952     R. A. ROBERT     2,618,448

STRUCTURE FOR AIRPLANE WINGS

Filed Dec. 14, 1945     7 Sheets—Sheet 1

Fig.1

Inventor.
ROGER AIME ROBERT.
By, Haseltine, Lake & Co.
Attorneys.

Nov. 18, 1952 R. A. ROBERT 2,618,448
STRUCTURE FOR AIRPLANE WINGS
Filed Dec. 14, 1945 7 Sheets-Sheet 2

Inventor,
ROGER AIME ROBERT.
By Haseltine, Lake & Co.
Attorneys.

Nov. 18, 1952   R. A. ROBERT   2,618,448
STRUCTURE FOR AIRPLANE WINGS
Filed Dec. 14, 1945   7 Sheets-Sheet 3
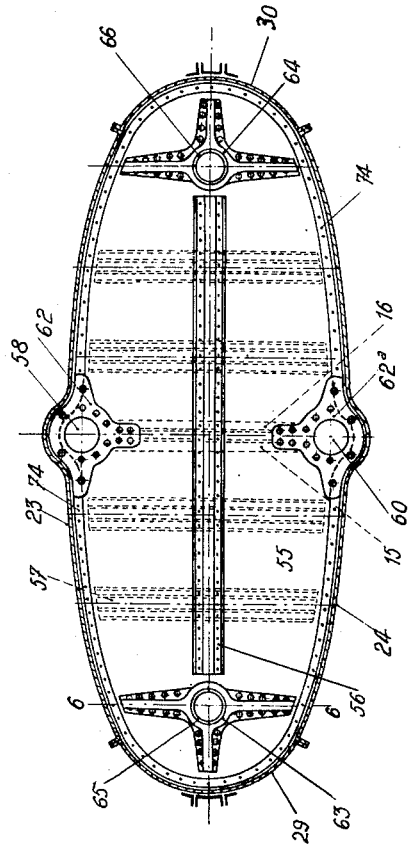
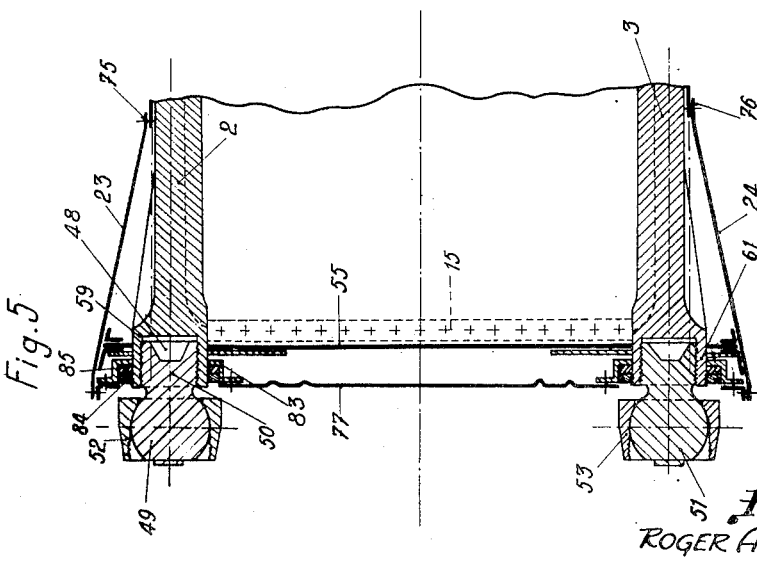
Inventor,
ROGER AIME ROBERT.
By Haseltine, Lake & Co.
Attorneys.

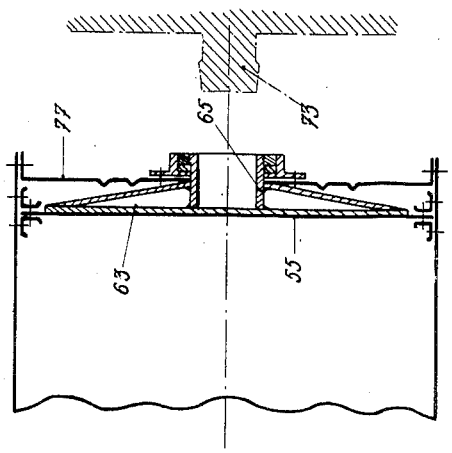
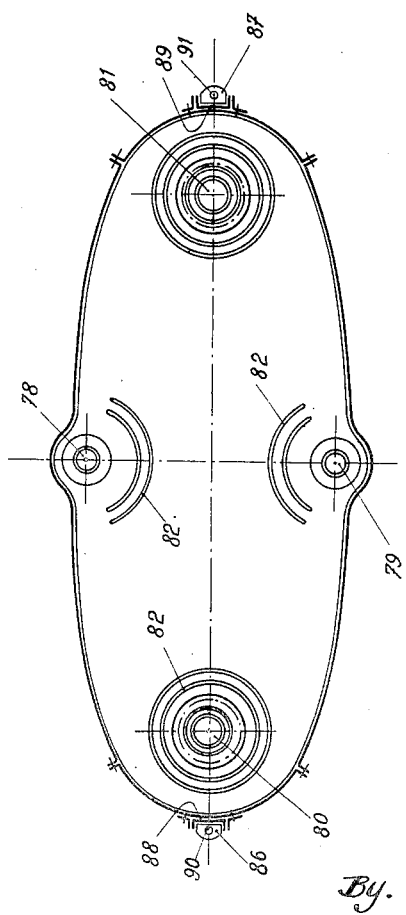

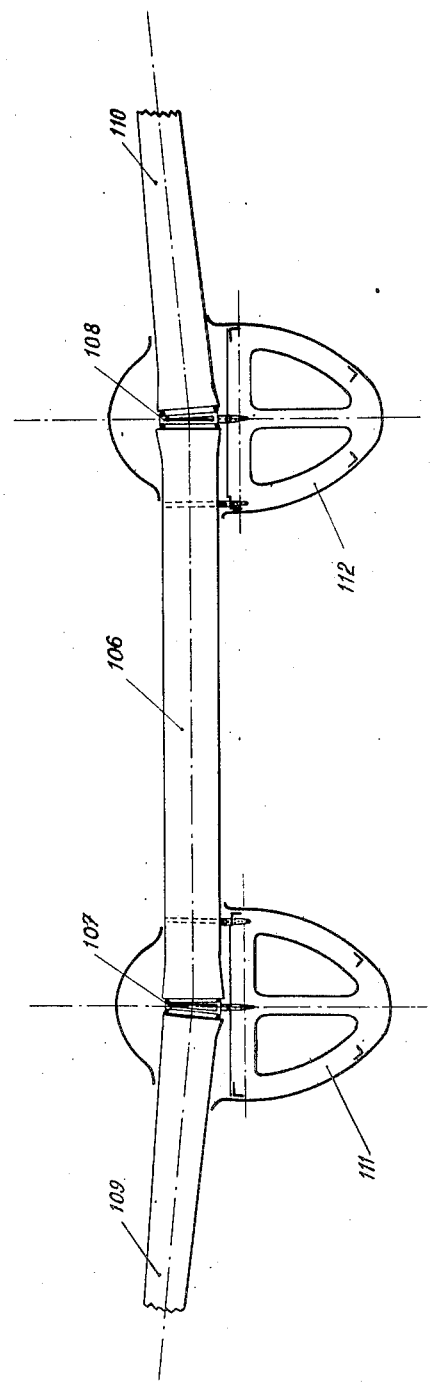

Nov. 18, 1952 R. A. ROBERT 2,618,448
STRUCTURE FOR AIRPLANE WINGS
Filed Dec. 14, 1945 7 Sheets-Sheet 6

Inventor,
ROGER AIME ROBERT.
By. Haseltine, Lake & Co.
Attorneys.

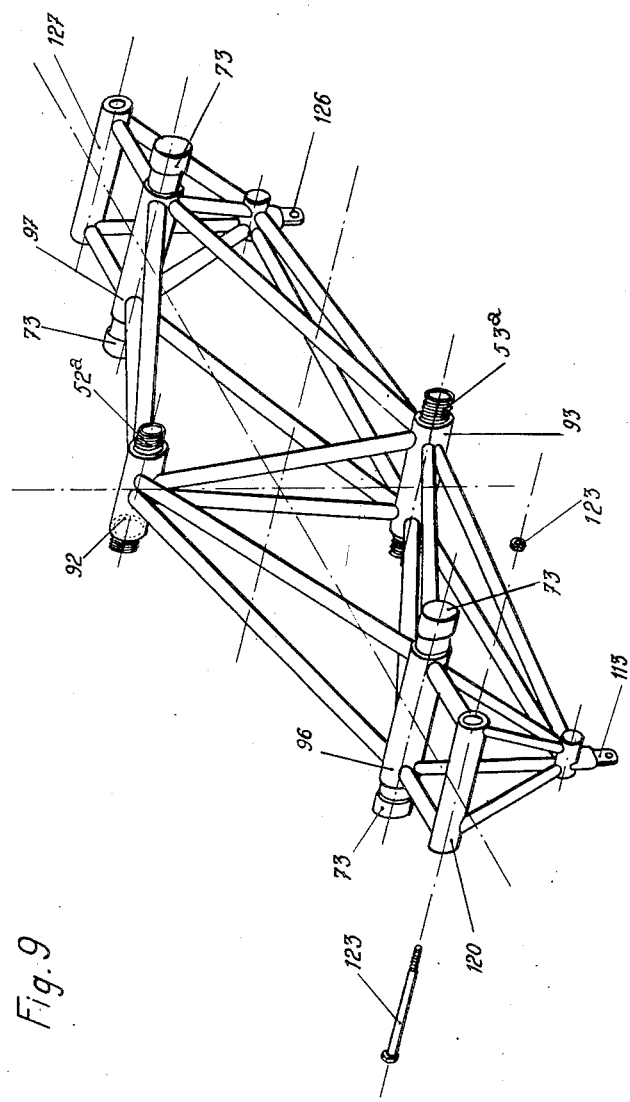

Patented Nov. 18, 1952

2,618,448

UNITED STATES PATENT OFFICE 2,618,448

STRUCTURE FOR AIRPLANE WINGS

Roger Aimé Robert, Boulogne-sur-Seine, France

Application December 14, 1945, Serial No. 634,933
In France December 12, 1941

Section 1, Public Law 690, August 8, 1946
Patent expires December 12, 1961

1 Claim. (Cl. 244—123)

The invention relates to an aircraft's wing with a main spar or beam to withstand to bending forces, and a secondary structure assuring resistance to the torsion and the drag forces.

The invention aims at combining and assembling these elements in such a way that this secondary structure will form a liquid-tight closed container.

The disposition according to the invention applies more particularly to wings in which the flanges of the main spar are of non-weldable material and in which the secondary structure is of weldable material. It has the advantage of relieving the weldings as much as possible of the concentration of strains introduced by connecting parts such as fittings for the attachment of the wing to the fuselage.

An object of the invention is therefore to realize an inner structure for aircraft's wing which is completely liquid-tight and in which the liquid-tight connections are carried out by welding, notwithstanding the fact that certain parts of the structure are of a non-weldable material.

Another object of the invention is to obtain an inner liquid-tight structure for an airplane's wing, in which the liquid-tight connections at the joint of said structure to an adjacent similar structure or to another part of the airplane such as a fuselage is practically relieved of the transmission of stresses likely to compromise the liquid-tightness of said joint.

Another object of the invention is to obtain an inner liquid-tight structure for an airplane's wing which will distribute the torsion and drag stresses to which the wing is subjected and transmit them to the adjacent parts.

Still another object of the invention is a process for the fabrication of inner liquid-tight structures for airplane's wings, ready to be applied immediately to the construction of wing panels or of entire wings of airplanes of very different types.

The invention is described hereafter in an embodiment chosen as an example, and in reference to the annexed drawing, in which:

Fig. 1 is a cross-section of an airplane's wing, comprising a structure according to the invention;

Fig. 3 is a front view of an end transverse partition of the structure;

Fig. 4 is a front view of a terminal tightening partition, adjacent to the end transverse partition of Fig. 3;

Fig. 5 shows one end of the structure, in a spanwise section taken along the mid-plan of the main spar;

Fig. 6 is a spanwise or longitudinal section, taken along line 6—6 of Fig. 3;

Fig. 7 is a diagrammatic view of an airplane, partially in cross-section, built according to the invention;

Fig. 9 is a perspective view of parts of the assembling device of Fig. 8.

Figure 2:
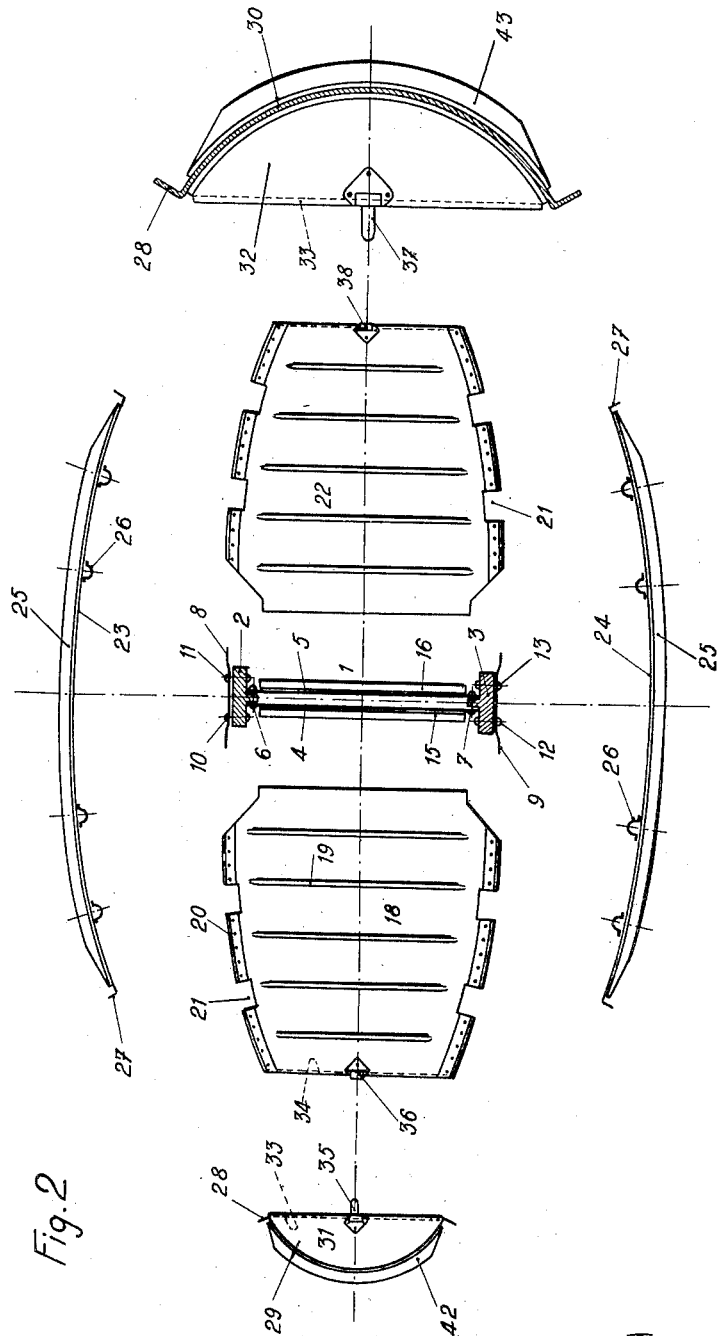
Fig. 2 is an exploded view of such a structure, in transverse section, one of the elements being on a larger scale in order to show more clearly the thicknesses.

Referring first to Figs. 1 and 2, one sees that the wing structure of the invention presents a main spar 1 with flanges 2 and 3 made of a non-weldable material and having a shape and profile adapted to the distribution of stresses along the wing, but mainly to withstand the bending moments applied to the wing. The flanges 2 and 3 are interconnected in the usual way by one or several webs—two in the example shown, 4 and 5. These webs are made of weldable or non-weldable material and are united to the flanges 2 and 3 by rows of rivets 6 and 7. Each flange 2 and 3 carries a cap strip, respectively 8 and 9, of weldable material and suitable shape, to which they are connected by rows of rivets 10, 11, respectively 12 and 13. The purpose of these strips will be described later on.

This skeleton is completed by transverse or fore-and-aft partitions 14 spaced along the main spar 1. To this end the webs 4 and 5 carry, at regular intervals or not, angle fittings 15 and 16, which may be secured to the webs by welding or riveting. On each angle fitting 15 is attached, for instance by a row of rivets 17, a half-partition 18 of appropriate shape and which may be provided with reinforcing ribs or corrugations 19. The edge of the half-partition 18 is formed by angle fittings 20 secured thereto by welding or riveting and in which are provided spaced notches 21, the function of which will be explained later. On the web 5 is attached, in a similar way, by the intermediary of the angle fittings 16 a series of complementary half-partitions 22.

An upper covering panel 23 and a lower covering panel 24, in weldable material, are attached, by welding, on the cap strips 8 and 9, and on the angle fittings 20 of partitions 14. These panels are reinforced by outer transverse stiffening stringers 25 and inner longitudinal stringers 26. These latter are located in the notches 21 provided for this purpose in the partition 14. The stringers 25 and 26 are in weldable material and are welded to their corresponding panel. These panels have longitudinal edges 27.

The panels 23 and 24 are attached, by welding of their edges 27 with corresponding edges 28, to a front panel 29 and a rear panel 30. On the front and rear panels are connected from place to place, by welding, elements of partition, respectively 31 and 32 which complete the half-partitions 18 and 22. Each of the partition elements 31 and 32 is provided with a flange 33 which fits against a corresponding flange 34 of the half-partition 18 or 22. The partition element 31 carries a centering stud which cooperates with a corresponding socket 36 provided in the half-partition 18, while the partition element 32 and the half-partition 22 present also, respectively, a centering stud 37 and a socket 38.

Outer stringers 42 and 43 are carried on panels 29 and 30 and prolong the stringers 25 of panels 23 and 24.

Fig. 1 shows, in transverse section, the finished structure and the wing placed on this structure. The wing has front ribs 44 and rear ribs 45, fixed on the outer stringers 25, 42 and 43 by appropriate means such as screws, bolts, etc. The skin 47 of the wing is disposed directly on the ribs 44 and 45 and is fixed thereto by appropriate means such as glue, screws, rivets, bolts, etc. . . . according to the nature of the material employed.

The structure according to the invention has a certain number of partitions 14 distributed throughout its length.

Now will be described, in reference to Figs. 3 to 6, the constitution of the ends of such a structure for its liquid-tight connection, either with a similar structure, or with another part of the airplane, such as the fuselage.

The flanges 2 and 3 of the main spar 1 terminate with a cap, ball joint, or similar device, in view of its connection with the adjacent part. In the example shown, the flange 2 terminates with a tapped hole 48 for the fixation of a ball 49, of which the tail 50 is correspondingly threaded. The flange 3 terminates also with a ball 51. The balls 49 and 51 are located in spherical sockets or similar contrivances 52 and 53, which are fixed, for instance, by screwing, on the adjacent part of the airplane.

The end transverse partition 55 of the structure is preferably made in a single piece. This partition may be of greater thickness than the other transverse partitions 14. It carries further, preferably, strengthening parts, horizontal 56 on one of its faces and vertical 57 on the other, and it is fixed on the webs 4 and 5 of the spar through the angle fittings 15 and 16. The partition 55 has an upper hole 58 for the passage of the end 59 of the flange 2 in which is tapped the hole 48 and a lower hole 60 for the passage of the end 61 of the flange 3. Around holes 58 and 60, the partition 55 is reinforced by gusset plates 62 and 62a, fixed by riveting or otherwise.

On partition 55 are attached, by riveting for instance, brackets 63 and 64 for carrying tubular supports or sockets 65 and 66. These tubular supports or sockets 65 and 66 receive pivots 73 formed on the adjacent part of the airplane to which the structure has to be connected. In this way, the torsion supported by the structure under consideration is transferred to the adjacent portion of the aircraft.

Partition 55 is edged peripherally by an angle fitting 74 on which the panels 23, 24, 29 and 30 are welded. It can be seen in Figure 5 that the distance between the upper and lower panels 23 and 24 respectively and the median plane of the wing, at the point where they are secured to this end partition 55, is greater than at the points where they are secured to the other transverse partitions of the structure.

A terminal tightening partition 77 (Fig. 4) completes the liquid-tightness of the structure. This partition presents holes 78 and 79 for the passage of flange ends 59 and 61, and holes 80 and 81 for the passage of tubular sockets 65 and 66. This partition, relatively thin, is formed so as to present some degree of elasticity in its own plan, in order to reserve to stronger partition 55 the distribution and the transfer of the stresses. In order to enhance this elasticity, the partition 77 possesses corrugations 82.

On partition 77 are tightly attached, for instance by welding, collarettes surrounding the cylindrical flange ends 59, 61 traversing the said partition. Between the collarette 83, surrounding the end 59 and a nut 84 screwed on a threaded part of said end, is pressed a tightening packing 85. Thus a perfect liquid-tightness is obtained for the crossing of each of the connecting parts of the structure to the adjacent portion of the aircraft.

In the front and at the rear of the structure are fixed connecting parts 86 and 87 (Fig. 4), through angle fittings 88 and 89 welded on the external side of the front and rear panels 29 and 30. The connecting parts 86 and 87 have a hole, respectively 90 and 91.

Figure 8:
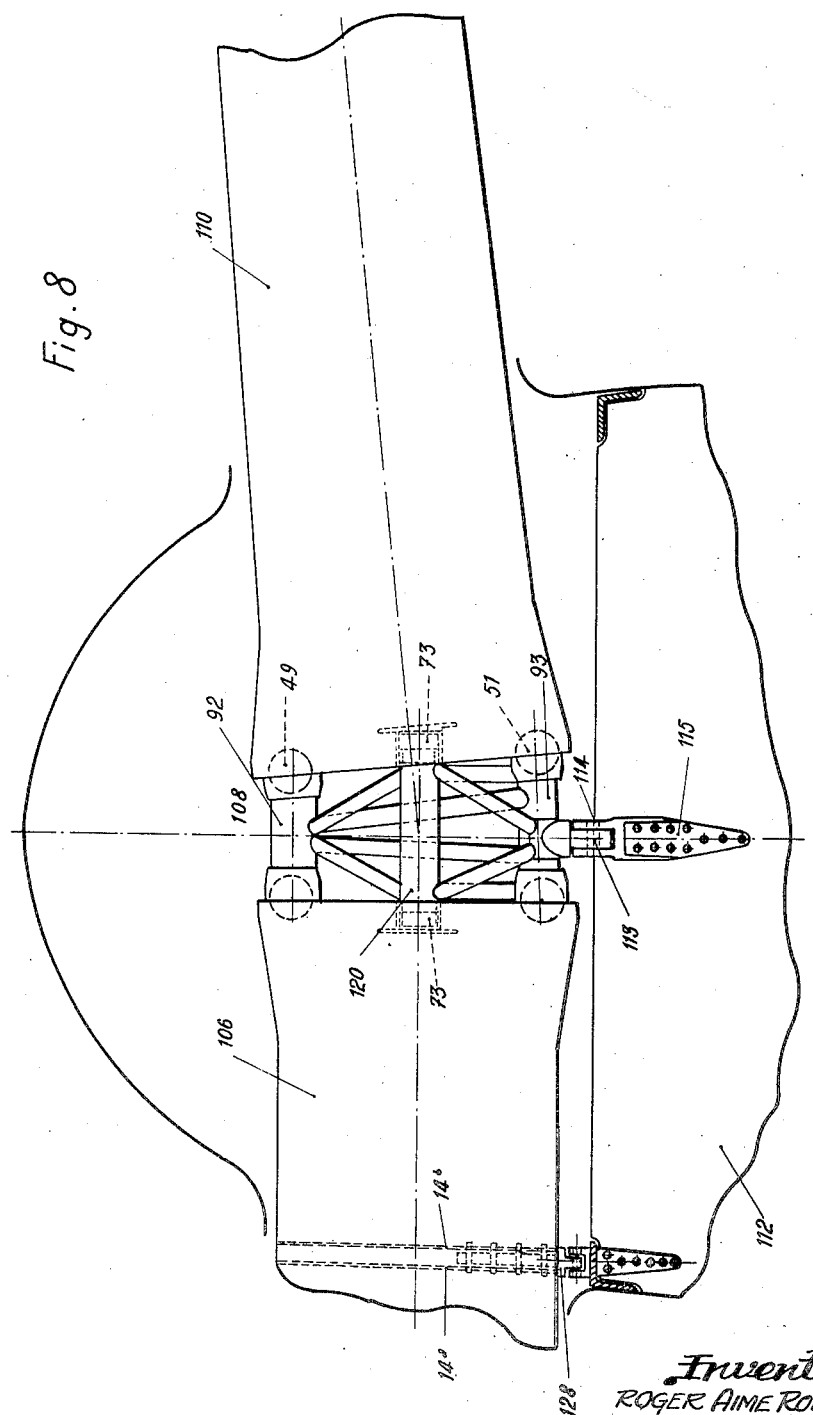
Fig. 8 is a view similar to Fig. 7 but on a larger scale showing a device for the assembly of two wing structure elements according to the invention.

Instead of being united directly one to the other, as has just been described, two adjacent structures, or a structure and an adjacent portion of the airplane, may be united through an intermediate connecting device which will now be described, with reference to Figs. 8 and 9. This connecting device (Fig. 9) has two tubular parts 92 and 93 terminating with threads 52a and 53a to receive thereon the tapped ends of the sockets 52, 53 of the ball joints of two adjacent structures, or of one structure and an adjacent portion of the airplane. The device has also two other tubular parts 96 and 97 whose ends are two pivots 73 for the connection with the adjacent structures. These four tubular parts are, in the example shown, united together by a framework made of welded tubular braces.

On Fig. 7 has been shown, in a diagrammatic transversal view, an airplane built according to the invention and having two fuselages. This airplane has a central structure 106 built according to the invention, as described above, and connected by two connecting devices 107 and 108 to two lateral wing structures 109 and 110, also built according to the invention. The connecting devices 107 and 108 are used, further, for the connection of the three structures 109, 106, 110 to the two fuselages 111 and 112 of the airplane. The connection between the device 108 and the structures 106 and 110, as well as to the fuselage 112, is shown in Fig. 8. The connecting device 108 presents, for the junction to the fuselage 112, a tenon 113 hinged in the forked end 114 of a fitting 115 fixed on the fuselage 112. The tenon 113 is connected to the tubular parts 93 and 96 of the connecting device by the tubular braces shown in Fig. 9. The front part of the connecting device 108 comprises also a sleeve 120 in which is disposed, with some clearance or play, a bolt 123 intended to be introduced, also with some clearance, in the connecting parts 86 of the adjacent structures. The connecting device has a similar rear tenon 126 and a rear sleeve 127 for the union through a bolt, of the two rear connecting parts 87.

The intermediate structure 106 is further connected to the skeleton of the fuselage 112 by an attachment 128 crossing the lower panel 24 through a cylindrical part; the tightness of this crossing is obtained in a way similar to the one used for the connecting parts interposed between the structures. The attachment 128 is prolonged inside the intermediate structure 106 and is disposed between two partitions 14a and 14b of this structure to which it is fixed for instance by bolts. The attachment 128 completes thus by use of a minimum of connecting parts, the connection of the fuselage 112 to the central or intermediate structure 106. At the junction of the attachment 128 to the fuselage 112, that is to say between the tenon of said attachment and the bearing fork carried by the fuselage, a transversal clearance is advantageously provided.

Having described my invention, what I claim, and desire to secure by Letters Patent, is:

A wing structure for airplane, comprising: a main spar; transverse rib-partitions in two halves connected each to this spar by their inner adjacent edges; and a continuous inner envelope made of a front, rear, upper and lower assembled panels, the front and rear panels having transverse rib-partition elements co-extensive with each of said halves and interconnected thereto by overlap of their adjacent edges and male and female centering means, carried respectively by said elements and by said halves cooperating to effect the connection of said elements to said halves.

ROGER AIMÉ ROBERT.

REFERENCES CITED

The following references are of record in the file of this patent:

UNITED STATES PATENTS

| Number | Name | Date |
|---|---|---|
| 1,616,008 | Stout | Feb. 1, 1927 |
| 1,785,318 | Lambert | Dec. 16, 1930 |
| 1,875,651 | Phelan | Sept. 6, 1932 |
| 1,887,627 | Finger | Nov. 15, 1932 |
| 1,902,956 | Hughes | Mar. 28, 1933 |
| 2,242,147 | Salisbury | May 13, 1941 |
| 2,347,542 | Cyron et al. | Apr. 25, 1944 |
| 2,382,950 | Watter | Aug. 14, 1945 |
| 2,386,170 | Watter | Oct. 2, 1945 |
| 2,397,184 | Klose | Mar. 26, 1946 |
| 2,407,614 | Montgomery et al. | Sept. 10, 1946 |

FOREIGN PATENTS

| Number | Country | Date |
|---|---|---|
| 363,262 | Great Britain | Dec. 17, 1931 |
| 387,719 | Great Britain | Feb. 13, 1933 |